(No Model.)
F. D. BLISS.
NUT FOR CARRIAGE AXLES.
No. 405,338. Patented June 18, 1889.
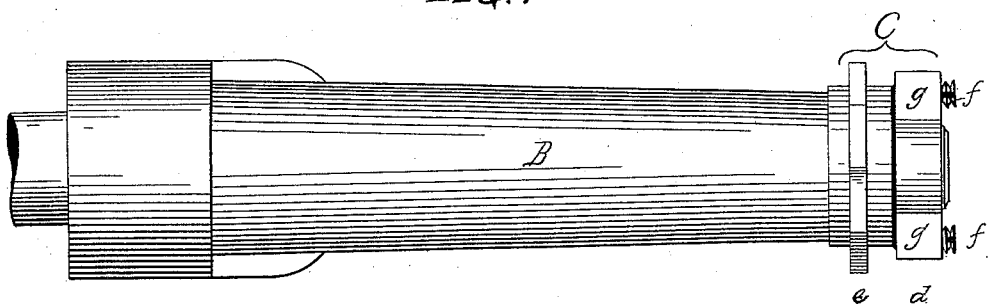
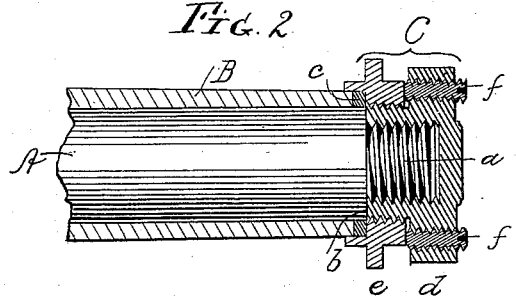
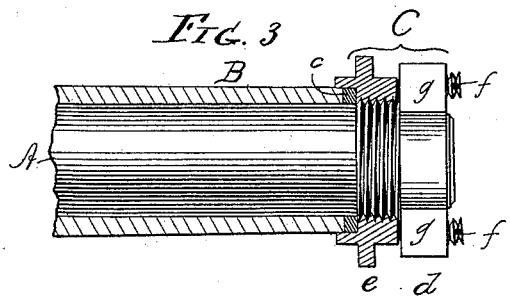
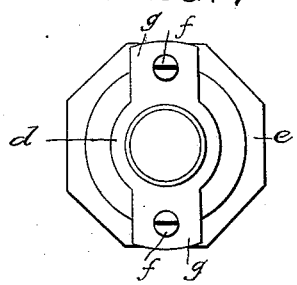
Witnesses:
James Terry
Charles L. Ullman
Inventor:
Francis D. Bliss
by George Terry
Atty

UNITED STATES PATENT OFFICE.

FRANCIS D. BLISS, OF BRIDGEPORT, CONNECTICUT.

NUT FOR CARRIAGE-AXLES.

SPECIFICATION forming part of Letters Patent No. 405,338, dated June 18, 1889.

Application filed December 26, 1888. Serial No. 294,687. (No model.)

*To all whom it may concern:*

Be it known that I, FRANCIS D. BLISS, a citizen of the United States, residing at Bridgeport, in the county of Fairfield and State of Connecticut, have invented certain new and useful Improvements in Nuts for Carriage-Axles, of which the following is a specification, reference being had therein to the accompanying drawings.

The object of my invention is the provision of an improved nut for vehicle-axles.

The invention is embodied in a nut composed of two parts, one of which is provided with an interior thread to turn upon the axle-nib, and also with an exterior thread to receive the other part of the nut, which is to be adjusted against the axle-box, as hereinafter fully explained, and pointed out in the claim.

In the drawings, Figure 1 is an exterior view of part of an axle, an axle-box, and my improved nut. Fig. 2 is a sectional view of the same parts, all of which, except the spindle of the axle with its screw-threaded nib, are in section. Fig. 3 is a view like that shown in Fig. 2, except that the outer portion of the nut is shown in elevation and not in section. Fig. 4 is a view in elevation of the outer end or face of the nut.

Corresponding parts in the different figures of the drawings are marked with like letters of reference.

The letter A designates the spindle, the end of which is made with a screw-threaded nib $a$, whose diameter is less than that of the spindle, so that the end of the spindle affords a concentric shoulder $b$, against which a part of the nut may be turned.

B designates the axle-box, and $c$ a washer of hardened steel, which fits into and is firmly held in the inner part of the nut.

C designates the nut, which, as before stated, is composed of two parts, as indicated by the letters $d$ and $e$. The outer part $d$ is provided with an interior right-hand thread, by means of which it may be turned upon the nib $a$, and an exterior left-hand thread to receive the inner part $e$, which is provided with a complementary interior thread. Thus constructed, the outer part of the nut is screwed up on the nib $a$ tightly against the shoulder $b$, and the inner part adjusted against the end of the box B, so that the box will have no play longitudinally on the spindle. The inner part $e$ of the nut is secured in its adjusted position by means of set-screws $f$ passing through wings or projections $g$ on the outer part $d$. The inner part of the nut is provided with a flange, which fits upon the surface of the outer side of the box, so that it will cover the joint between these parts and aid in excluding dust, &c., from the bearing.

Supposing the nut shown in the drawings to be on the axle at the right-hand side of the vehicle, it will be seen that should the set-screws become loose the friction of the box will tend to turn the inner part of the nut (its thread being a left-hand thread) away from the box instead of toward it, and prevent the binding of the parts and consequent stoppage of the wheel.

It is perhaps unnecessary to say that I do not limit myself to the particular form of the different parts shown in the drawings, and that the invention is adapted for use upon machinery where a construction similar to the box and spindle or bearing is employed.

I am aware that axle-nuts have been constructed in various ways, and that a nut has been made not altogether unlike my own, the nut consisting, essentially, of an internally and externally threaded part and an adjustable part fastened by a jam-nut.

What I claim, and desire to secure by Letters Patent, is—

The herein-described axle-nut, consisting of an internally and externally screw-threaded part provided with wings and of set-screws passing through said wings, with their ends bearing upon the face of the internally-screw-threaded and adjustable part, in combination with the said internally-screw-threaded and adjustable part, substantially as and for the purpose described.

In testimony whereof I affix my signature in presence of two witnesses.

FRANCIS D. BLISS.

Witnesses:
GEORGE TERRY,
J. EDWARD LUDINGTON.